United States Patent
Mahmoud

(12) 
(10) Patent No.: US 6,971,003 B1
(45) Date of Patent: Nov. 29, 2005

(54) METHOD AND APPARATUS FOR MINIMIZING OPTION ROM BIOS CODE

(75) Inventor: Fadi Mahmoud, Livermore, CA (US)

(73) Assignee: Adaptec, Inc., Milpitas, CA (US)

( * ) Notice: Subject to any disclaimer, the term of this patent is extended or adjusted under 35 U.S.C. 154(b) by 606 days.

(21) Appl. No.: 10/115,734

(22) Filed: Apr. 2, 2002

(51) Int. Cl.[7] ........................................ G06F 15/177
(52) U.S. Cl. .................................... 713/2; 713/1
(58) Field of Search ........................... 713/1, 2, 100

(56) References Cited

U.S. PATENT DOCUMENTS

| | | | |
|---|---|---|---|
| 5,136,713 A * | 8/1992 | Bealkowski et al. ............ | 713/2 |
| 5,948,076 A * | 9/1999 | Anubolu et al. ................ | 710/8 |
| 6,425,079 B1 * | 7/2002 | Mahmoud ........................ | 713/2 |
| 6,725,178 B2 * | 4/2004 | Cheston et al. ............. | 702/186 |
| 2002/0188837 A1 * | 12/2002 | Dayan et al. ................... | 713/2 |

* cited by examiner

Primary Examiner—Dennis M. Butler
(74) Attorney, Agent, or Firm—Martine Penilla & Gencarella LLP

(57) ABSTRACT

A method for configuring a Redundant Array of Inexpensive Disks (RAID) host adapter card is provided. The RAID host adapter card includes a flash storage chip and a RAID input/output processor (IOP). The RAID host adapter card is coupled to a peripheral connection interface (PCI) bus of a computer system and is interconnected to at least one storage container. The computer system has a system memory. The method includes booting the computer system and passing control to the RAID IOP. The RAID IOP reads the flash storage chip to execute a fraction of code previously written to the flash storage chip. The RAID IOP further communicates to the hard drive to locate a main portion of code previously written to at least one hidden sector. The RAID IOP also loads the main portion of the code to the system memory of the computer system to enable interoperability of the host adapter card with the computer system.

25 Claims, 10 Drawing Sheets

METHOD AND APPARATUS FOR MINIMIZING OPTION ROM BIOS CODE

BACKGROUND OF THE INVENTION

1. Field of the Invention

The present invention relates generally to the field of computing technology, and more particularly, to methods and structures for processing code associated with option ROM BIOS images.

2. Description of the Related Art

As is well known, during a computer system initialization routine, commonly referred to as a boot sequence, a variety of diagnostics are performed to ascertain the availability and status of hardware devices and ensure proper operation of components. For example, during initialization, a Basic Input Output System (BIOS) executes a boot program, which invokes a series of system checks to ascertain the location, number and identity of various devices connected to the computer system. The processing components may be a variety of host adapter cards including, by way of example only, a video display adapter, a network adapter, a Small Computer System Interface (SCSI) adapter, or other similar devices. Further, these host adapter cards may either be non-processor based, such as some SCSI and Redundant Array of Inexpensive Disks (RAID) controllers, or may be processor based, such as some high end or low end RAID controllers.

In any event, each of these processing components has an associated option Read Only Memory (ROM) BIOS chip, each of which includes corresponding program instructions known as the option ROM BIOS (hereinafter referred to as a "BIOS image.") The BIOS image residing on each of the host adapter cards is ultimately read and placed in the system memory. Typically, the size of an exemplary BIOS image is 32K. However, as the need for more functionality in the initialization process continues to grow, so does the size of the BIOS image.

The increase in size of the BIOS image is specifically more pronounced where a native full extensible firmware interface ("EFI") architecture for option ROMs is implemented. FIG. 1 is a simplified, schematic view of an exemplary computer system implementing the EFI architecture, in accordance with the prior art. The computer system 100 includes a system BIOS 116, a host adapter card 102, and a plurality of hard disk drives 104a through 104c. The system BIOS 116 is connected to a PCI bus 114 while the host adapter card 106 is connected to the PCI bus 114 using a plug 110. The host adapter card 102 is coupled to the plurality of hard disk drives 104a–c wherein the hard disk drives 104a–c are connected consecutively.

The option ROM BIOS chip 106 includes the EFI component 108, which is an interface between the computer system 100 operating system and the platform firmware. The EFI component 108 provides a standard environment for booting the computer operating system and running pre-boot applications. In this manner, the EFI component 108 reduces existing compatibility issues between the system BIOS of different computer systems. The EFI component 108 is implemented in itanium™ architecture-based computer systems that provide firmware interface to boot Instruction Set Architecture ("IA-64") computer system. The EFI component 108 files are written and compiled implementing the C language and are maintained in very large libraries. As a consequence, the host adapter card 102 must be capable of supporting a BIOS image that exceeds one megabyte.

For instance, to benefit the functionality of the EFI architecture, the option ROM BIOS Chip 106, typically capable of storing a 32K BIOS image, should be replaced. That is, the option ROM BIOS chip 106 should be replaced by a chip capable of supporting a size in MB. In fact, in one example, the replacement chip should be capable of supporting a size of about 8 MBs.

Plainly stated, the file sizes continue to grow, thus requiring larger and larger chips to store code (e.g., the EFI code or any other code). Of course, the larger size of the chips negatively effects the cost of the entire computer system, as the larger are the chips, the more costly the entire computer system will be.

In view of the foregoing, there is a need for a new methodology and apparatus for reducing compatibility issues between system BIOS of different computer systems.

SUMMARY OF THE INVENTION

Broadly speaking, the present invention fills these needs by providing an apparatus and methods for reducing compatibility problems between diverse system BIOSs using an option Rom BIOS code implementing a flash chip for use on a host adapter card. In one example, the option ROM BIOS code can be an extensible firmware interface ("EFI"). In a specific embodiment, the flash chip includes a code component and a firmware component. A fraction of the code component hereinafter referred to as "tag code" is implemented to locate a main portion of the code component, hereinafter referred to as "hidden code" stored on a hidden sector of a hard disk drive connected to the host adapter card. It should be appreciated that the present invention can be implemented in numerous ways, including as a process, an apparatus, a system, a device, or a method. Several inventive embodiments of the present invention are described below.

In one embodiment, a method for configuring a Redundant Array of Inexpensive Disks (RAID) host adapter card is disclosed. The RAID host adapter card includes a flash storage chip and a RAID input/output processor (IOP). The RAID host adapter card is coupled to a peripheral connection interface (PCI) bus of a computer system and is interconnected to at least one hard drive. The computer system has a system memory. The method includes booting the computer system and passing control to the RAID IOP. The RAID IOP is configured to read the flash storage chip to execute a fraction of a code component previously written to the flash storage chip. The RAID IOP is further configured to communicate to the hard drive to locate a main portion of the code component previously written to a hidden region. The RAID IOP is configured to load the main portion of the code component to the system memory of the computer system.

In another embodiment, a method for configuring a Redundant Array of Inexpensive Disks (RAID) host adapter card is disclosed. The RAID host adapter card is configured to include a flash storage chip and a RAID input/output processor (IOP). The RAID host adapter card is coupled to a peripheral connection interface (PCI) bus of a computer system and is interconnected to at least one storage container. The computer system has a system memory. The method includes booting the computer system and passing control to the RAID IOP. The RAID IOP is configured to read the flash storage chip to execute a fraction of code previously written to the flash storage chip. The RAID IOP is further configured to communicate to the hard drive to locate a main portion of code previously written to at least one hidden sector. The RAID IOP is also configured to load the main portion of the code to the system memory of the computer system to enable interoperability of the host adapter card with the computer system.

In yet another embodiment, a host adapter card for enabling a computer system to have operation of a Redundant Array of Inexpensive Disks (RAID) is disclosed. The host adapter card comprises a flash storage chip and a RAID input/output processor (IOP). The host adapter card is coupled to a peripheral connection interface (PCI) bus of the computer system and is interconnected to at least one hard drive. The RAID IOP is configured to read the flash storage chip to execute a fraction of an option Read Only Memory (ROM) Basic Input Output System (BIOS) code previously written to the flash storage chip. The fraction of the option ROM BIOS code has instructions to cause communication with the at least one hard drive to locate a main portion of the option ROM BIOS code previously written to at least one hidden sector on the at least one hard drive. The RAID IOP is further configured to copy the main portion of the option ROM BIOS code to system memory of the computer system to enable proper interoperability between the computer system and the host adapter card operating with the option ROM BIOS code.

In still another embodiment, a method for configuring a computer system to operate with a host adapter card is disclosed. The host adapter card is configured to have a flash memory chip that has a limited memory size. The host adapter card is further configured to be in communication with a hard drive of the computer system. The method includes booting the computer system and reading the tag code resident in the flash memory chip. The tag code has identifying information for locating hidden code on the hard drive. The method further includes loading the hidden code from the hard drive to system memory of the computer system to enable interoperability of the host adapter card and the computer system.

In yet another embodiment, a method for configuring a Redundant Array of Inexpensive Disks (RAID) host adapter card is disclosed. The RAID host adapter card includes a flash storage chip and a RAID input/output processor (IOP). The RAID host adapter card is coupled to a peripheral connection interface (PCI) bus of a computer system and is interconnected to at least one hard drive. The computer system has a system memory. The method includes booting the computer system and passing control to the RAID IOP. The RAID IOP is configured to read the flash storage chip to execute a fraction of an option Read Only Memory (ROM) Basic Input Output System (BIOS) code previously written to the flash storage chip. The RAID IOP is further configured to communicate to the hard drive to locate a main portion of the option ROM BIOS code previously written to a hidden region. The RAID IOP is configured to load the main portion of the option ROM BIOS code to the system memory of the computer system.

The advantages of the present invention are numerous. Most notably, the flash chip of the present invention substantially reduces the compatibility problems associated with different system BIOS at a minimal cost. Another advantage of the flash chip of the present invention is that maintaining the main portion of the option ROM BIOS code (e.g., code component, or other code) on the hard disk drive enables implementation of smaller size flash chips, thus reducing the cost and space occupied on the host adapter card. In addition, other code can also be stored on the hard disk drive and then be accessed by the tag code.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for reducing the cost of a chip implementing option Read Only Memory (ROM) Basic Input Output System (BIOS) code is provided. In one embodiment, the option ROM BIOS code can be an extensible firmware (EFI) interface. In this embodiment, a flash chip is implemented on a host adapter card, such as a RAID card. The flash chip includes an option ROM BIOS code (e.g., code component, EFI component, or other code) so as to reduce compatibility problems between system BIOSs of different computer systems. The code component is analogous to an option ROM image of an option ROM BIOS, which is used to store program instructions. In one example, the contents of the code component are, among others, a header, memory allocator code, decompressor code, runtime code, initialization code, and configuration utility code.

In a further aspect of the invention, rather than maintaining the entire code component on the flash chip, only a fraction of the code component (i.e., tag code) is maintained on the flash chip. However, a main portion of the code component (i.e., hidden code) is stored on a hidden region (e.g., sector or sectors) of a storage container (e.g., hard disk drive) that is connected to the host adapter card. Preferably, in one example, the hidden code stored on a concealed region (e.g., sector) of the hard disk drive is located and loaded into the system memory using the tag code. In a different implementation, the hidden code is loaded into the system memory and is automatically written back into the hard disk drive in case of a shut down. In another embodiment, the entire code component is stored on a plurality of less expensive chips of the controller card.

Figure 1:
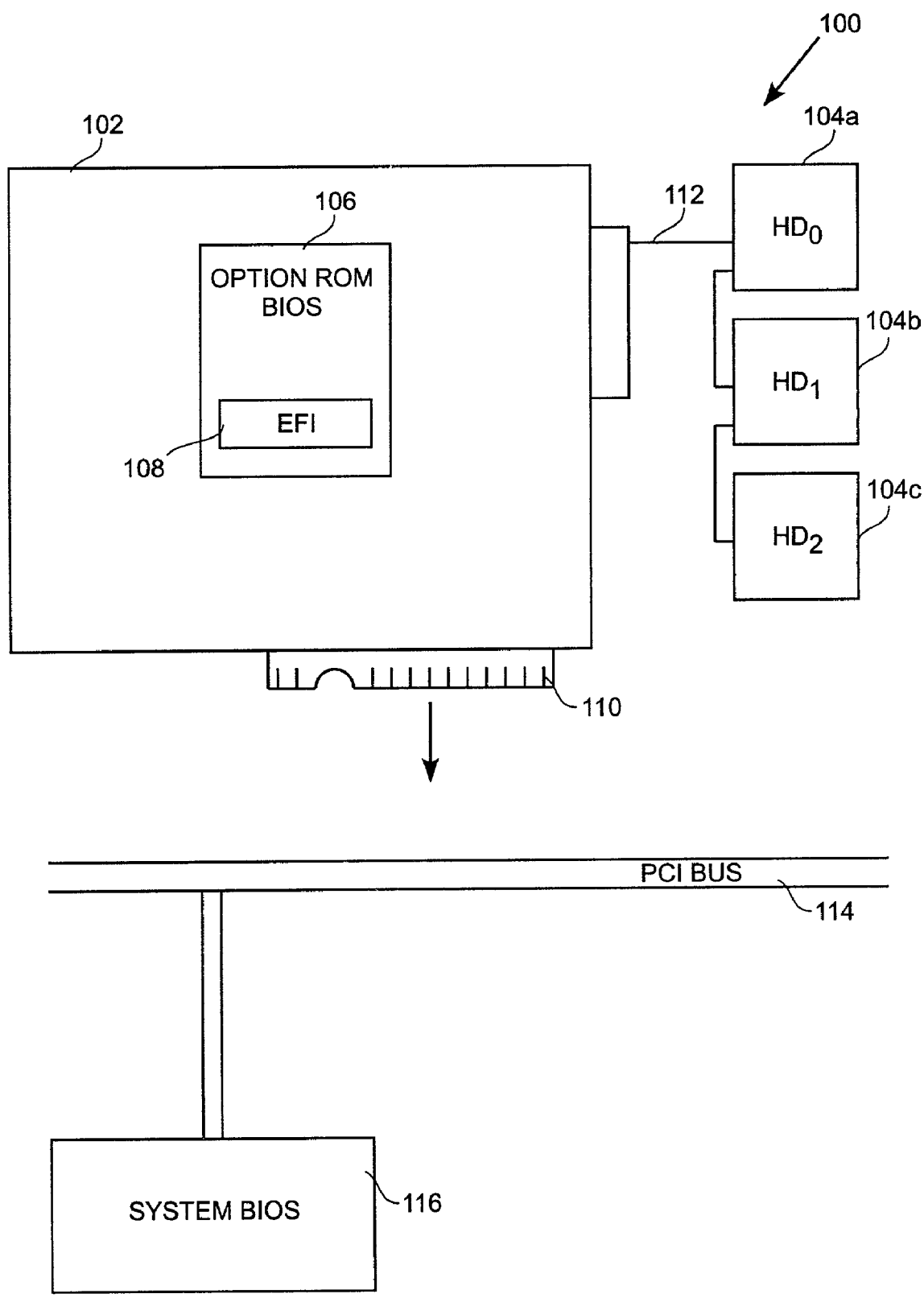
FIG. 1 illustrates a simplified schematic diagram illustrating a host adapter card including an Option ROM BIOS chip, in accordance with the prior art.
Figure 2A:
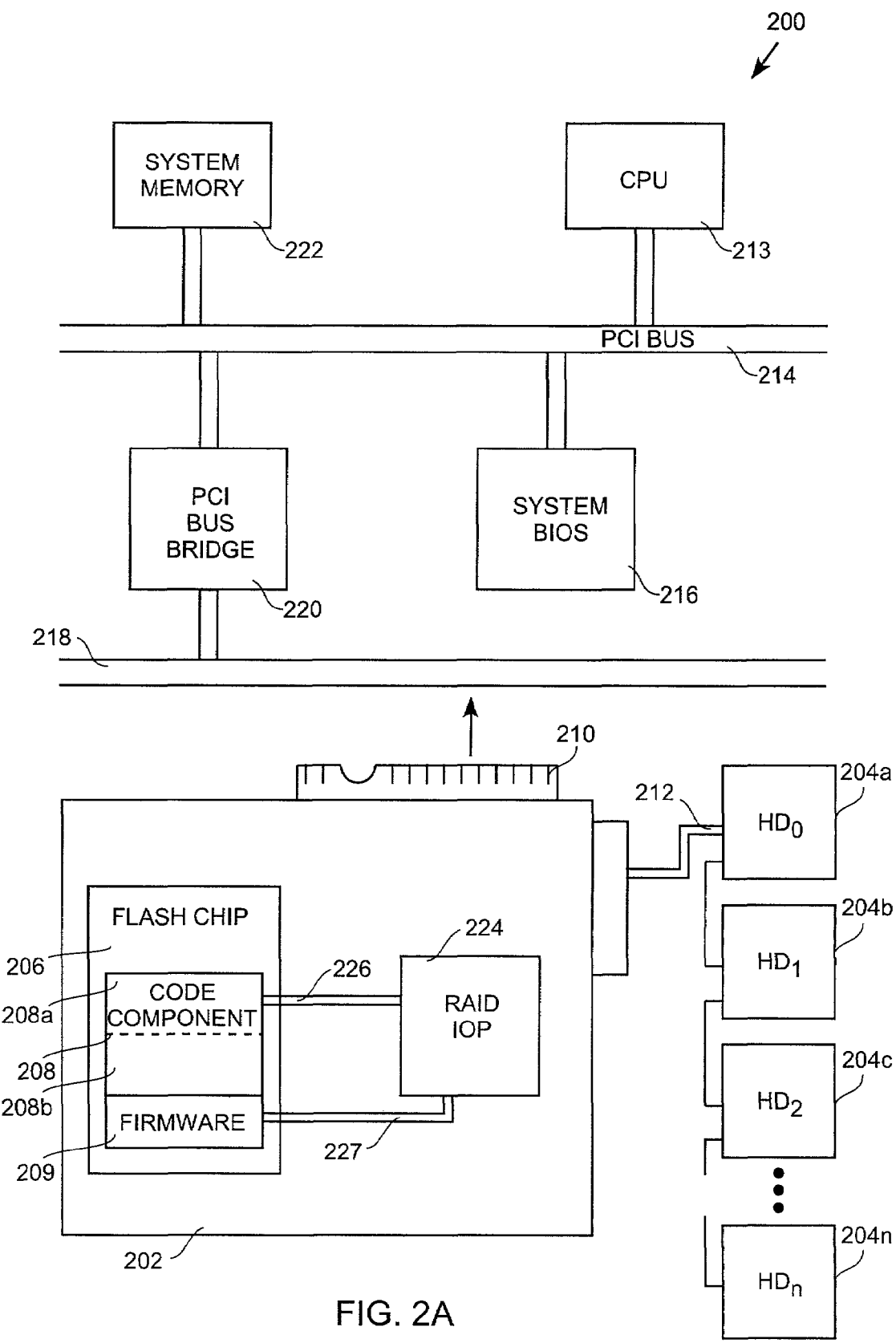
FIG. 2A depicts a simplified schematic diagram of a computer system implementing a flash chip including a code component and a firmware component, in accordance with one embodiment of the present invention.

Reference is now made to FIG. 2A illustrating a simplified schematic diagram of a computer system 200 implementing a flash chip 206 including a code component 208 and a firmware component 209, in accordance with one embodiment of the present invention. The computer system 200 includes a host processor 213, a primary Peripheral Component Interconnect (PCI) bus 214, a system memory 222, a system BIOS 216, the host adapter card 202, and a RAID array of hard disk drives 204a through $204_n$, defining one or more containers. The host processor 213 and the system memory 222 are coupled to the primary PCI bus 214. The host processor 213 processes information such as data and instructions while the system memory 222 stores and provides information to the processor 213.

The primary PCI bus 214 provides a high speed data path between the processor 213 and the connected peripheral devices so as to provide additional functionality. For instance, the RAID array of hard disk drives 204 is connected to the primary PCI bus 218 through the host adapter card 202. The host adapter card 202 is in turn coupled to a secondary PCI bus 218 that is connected to the PCI-system bus bridge 220. The host adapter card is connected to the secondary CPI bus using a plug 210. The host adapter card 202 is configured to interface and control access to the RAID array of hard disk drives 204a through $204_n$, using connection 212. In addition to the flash chip 206, the host adapter card 202 includes a RAID Input/Output Processor (RAID IOP) 224. The RAID IOP 224 includes logic for performing XOR calculations and also has cache memory for storing code from the flash chip 206 and processing the code.

The flash chip 206 includes the code component 208 and the firmware component 209. Analogous to the option ROM image of an option ROM BIOS, the code component 208 includes a set of instructions. In one example, the code component 208 is configured to be about 0.5 MB. However, in a different embodiment, the code component may be configured to be about 4 MB. In cases where the code component is larger than 0.1 MB, for example, the code component is split so that a smaller flash chip can be used on the host adapter card 202.

Figure 2B:
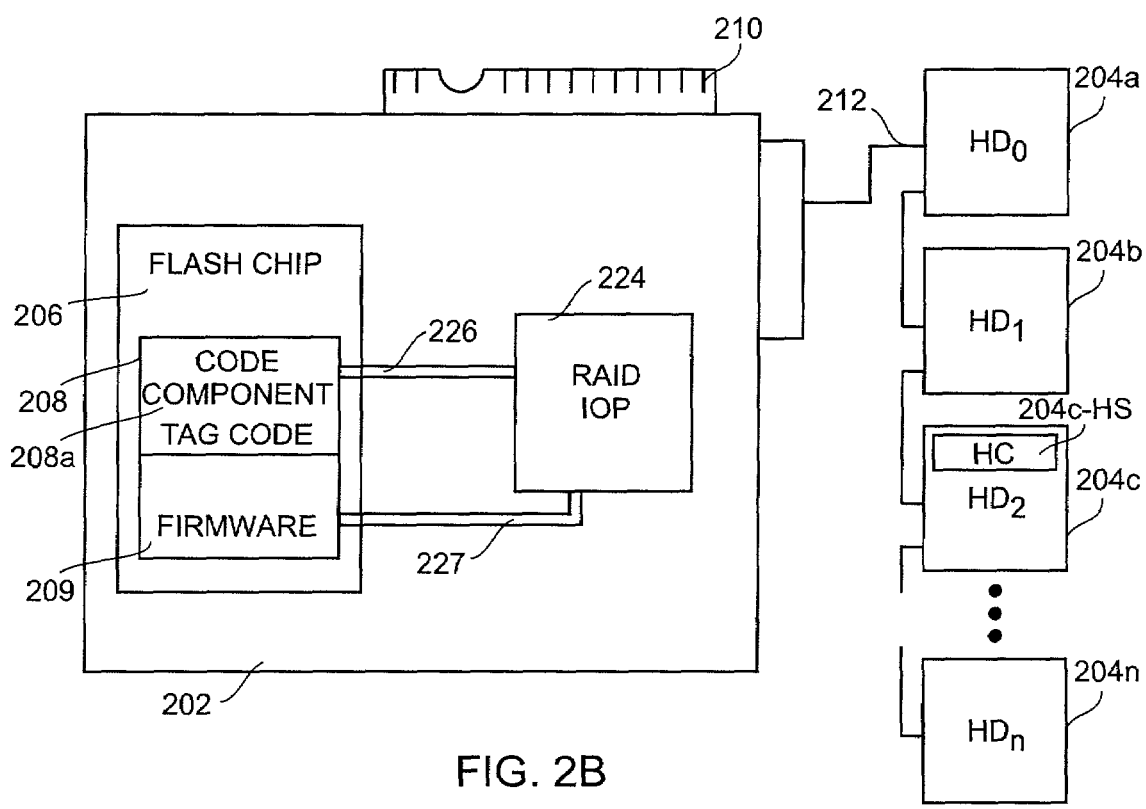
FIG. 2B is a simplified schematic diagram illustrating the storing of the hidden code of the code component on a hidden sector on the hard disk drive, in accordance with yet another embodiment of the present invention.

Reference is made to FIG. 2B illustrating the storing of the hidden code 208b of the code component 208 on a hidden sector 204c-HS on the hard disk drive 204c, in accordance with one embodiment of the present invention. Of course, if the hard disk drive 204c is a container, it can itself be a number of hard disk drives, and the sector can actually be replicated (according to the selected RAID level algorithm). In one exemplary embodiment, the system BIOS 216 locates and identifies the host adapter card 202 that is connected to the PCI bus 214. Upon identifying the host adapter card 202, the system BIOS passes control to the RAID IOP 224 connected to the flash chip 206 using 226. Implementing connection 212 (e.g., SCSI connection, Advanced Technology Attachment (ATA) connection, etc.), the RAID IOP 224 writes the hidden code 208b on a hidden sector 204c-HS on the hard drive 204c. In one example, the RAID IOP 224 acts as a memory allocator, locating the necessary amount of storage required to store the hidden code 208b. Additional details regarding the locating and loading of the hidden code 208b are provided below in reference with FIG. 2C.

If the entire EFI code is about 0.5 MB, a size of the tag code 208a can be configured to be less than about 0.1 MB while a size of the hidden code 208b can be configured to be about 0.4 MB. In another embodiment, the size of the tag code may be less than about 0.5 MB while the size of the hidden code 208b is about 1.5 MB. In this embodiment, the firmware is configured to be about 2 MB. By storing a large portion of the code component on the hidden sector of the drive, it is possible to reduce the size of the host adapter card flash chip, thus reducing the cost of the entire host adapter card. In addition, by using this technique, it is possible to store additional code for other uses on the hard disk drive.

Figure 2C:
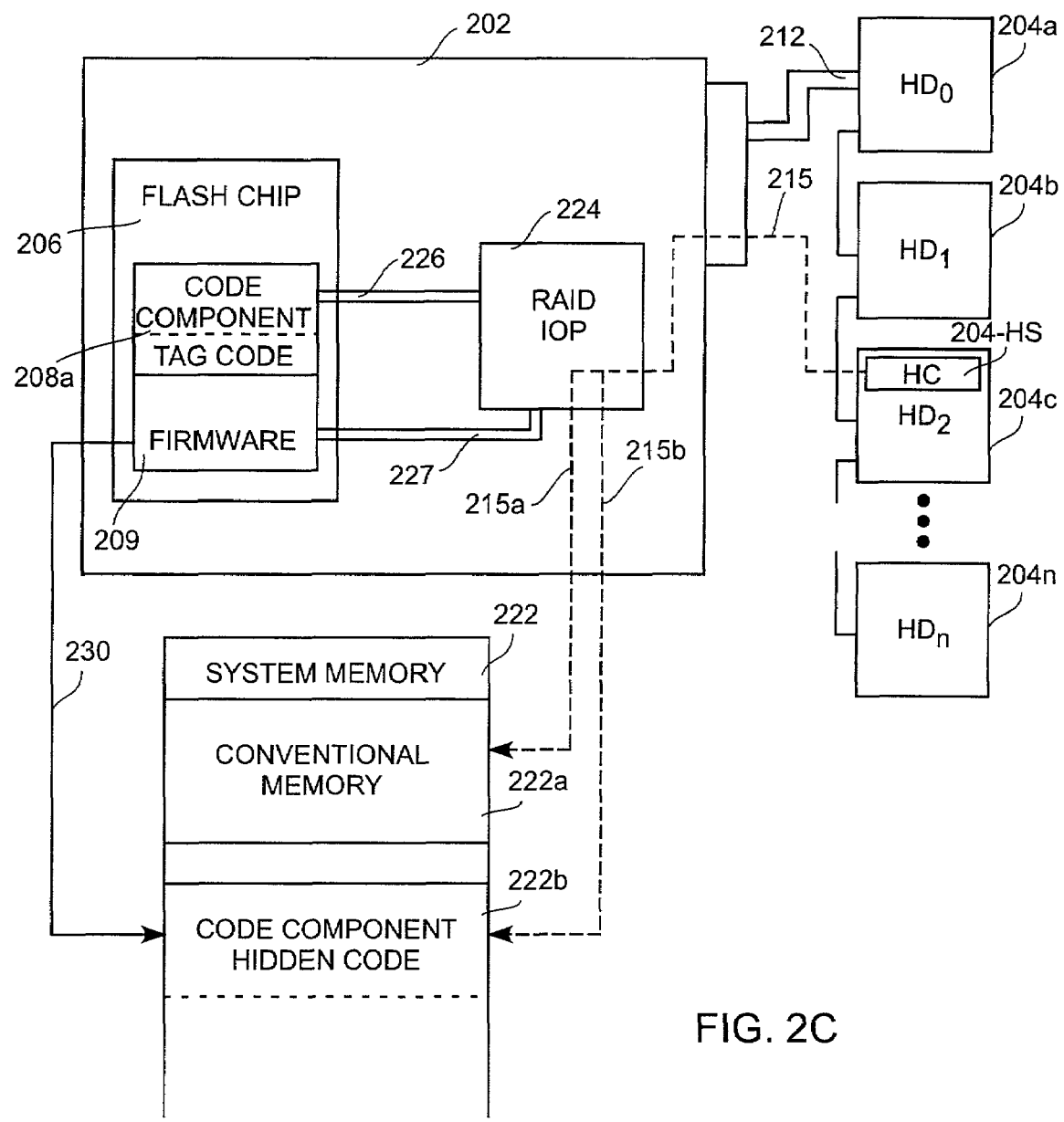
FIG. 2C is a simplified schematic diagram showing the locating and loading of the hidden code, in accordance with still another embodiment of the present invention.

In accordance with one embodiment of the present invention, locating and loading of the hidden code 208b can be understood with respect to the simplified schematic diagram of FIG. 2C. As illustrated, subsequent to writing the hidden code 208b on the hidden sector 204c-HS on the hard disk drive 204c, the tag code 208a of the code component is run providing the RAID IOP 224 necessary information as to the location of the hidden code 208b. In turn, using 215, 215a and 215b, the RAID IOP 224 provides the hidden sector 204c-HS data to the system memory 222 as it includes a conventional memory section 222a and the EFI hidden code section 222b. In this manner, despite implementing a code component of any size, the flash chip of the present invention maintains a substantially smaller fraction of the code component, substantially reducing the cost of the implemented flash chip that needs to be integrated onto the host adapter card 202.

In one exemplary embodiment, configuring the computer system implementing the flash card 202 may be performed by installing a RAID card including, among others, the BIOS file and the drivers file, using a RAID utility CD (or code downloaded from the Internet, obtained from a disk, or over a network). In one embodiment, upon executing the RAID utility CD, simply the main portion of the code component is stored on a hidden sector (or sectors) of hard disk drive (or drives if implementing a container) while the tag code is written to the code component of the flash chip. In one implementation, subsequent to storing of the main portion of the EFI on the hidden sector, the user is advised of the bootability of the hard disk drives, requesting the user to reboot the system before further use.

In one embodiment of the present invention, a determination is made as to whether the main portion of the code component stored on the hidden sector of the hard disk drive is missing. For instance, in one example in which an IA-64 system is implemented, the components (e.g., hard disk drives) of the system can be removed or replaced easily by hot plugging. As a result, IA-64 systems are rarely required to be shut down. In such scenarios, detecting the hot plugging of hard disk drives and thus the loss of the main portion of code component stored on the hard disk drives can easily be achieved by selecting and implementing a triggering event and monitoring same. In one example, such triggering event can be a user's request to stop the I/O process since prior to shutting down the computer system the I/O process should be stopped.

For instance, if stopping the I/O process is set to be the triggering event, the RAID IOP may be configured to verify the existence of the main portion of the EFI on the hidden sector (or sectors) of the hard disk drive (or drives) prior to stopping the I/O process. In the event the hard disk drive has been hot plugged, lacking the main portion of the code component (i.e., the option ROM image) can easily be detected. In such situation, the customer can be instructed to re-boot the system so as to re-store the main portion of the code component on the replacement hard disk drive using the utility CD or the code downloaded from the Internet.

In a different situation, rather than the disk drives, the host adapter card may have been hot plugged and replaced. In such situation, there is a minimal effect on the system since the main portion of the EFI is still intact since it has been stored on the hidden sector (or sectors) of the hard disk drive (or drives).

Figure 3A:
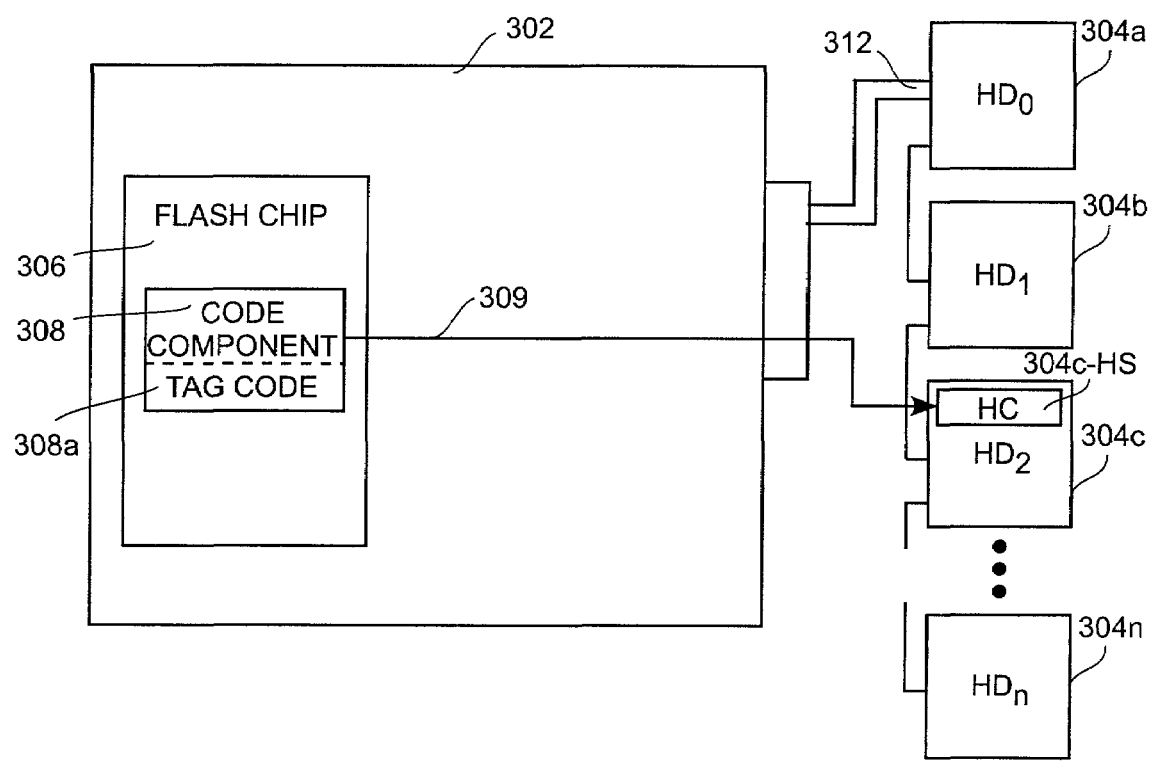
FIG. 3A is a simplified schematic diagram depicting implementing the code component in a non-processor based host adapter card, in accordance with still another embodiment of the present invention.

Implementing the code component in a non-processor based host adapter card, can be understood with respect to the simplified schematic diagram of FIG. 3A, in accordance with one embodiment of the present invention. The host adapter card 302 is shown to include a flash chip 306 and the code component 308. The code component 308 is configured to contain a tag code 308$a$ and a hidden code 308$b$. The flash chip 302 is connected to a plurality of hard disk drives 304$a$ through 304$_n$ using a connection 312. In one example, upon passing control to the host adapter card 302, the EFI tag code 308$a$ is run providing the system with necessary information as to the location of the hidden code 308$a$ on the hidden sector (or sectors) 304$c$-HS of the hard disk drive (or drives) 304$c$. In one exemplary embodiment, the information stored in the flash chip 306 is read by the CPU and is subsequently used to allocate and locate the hidden code 308$b$ on the hidden sector 304$c$-HS.

Figure 3B:
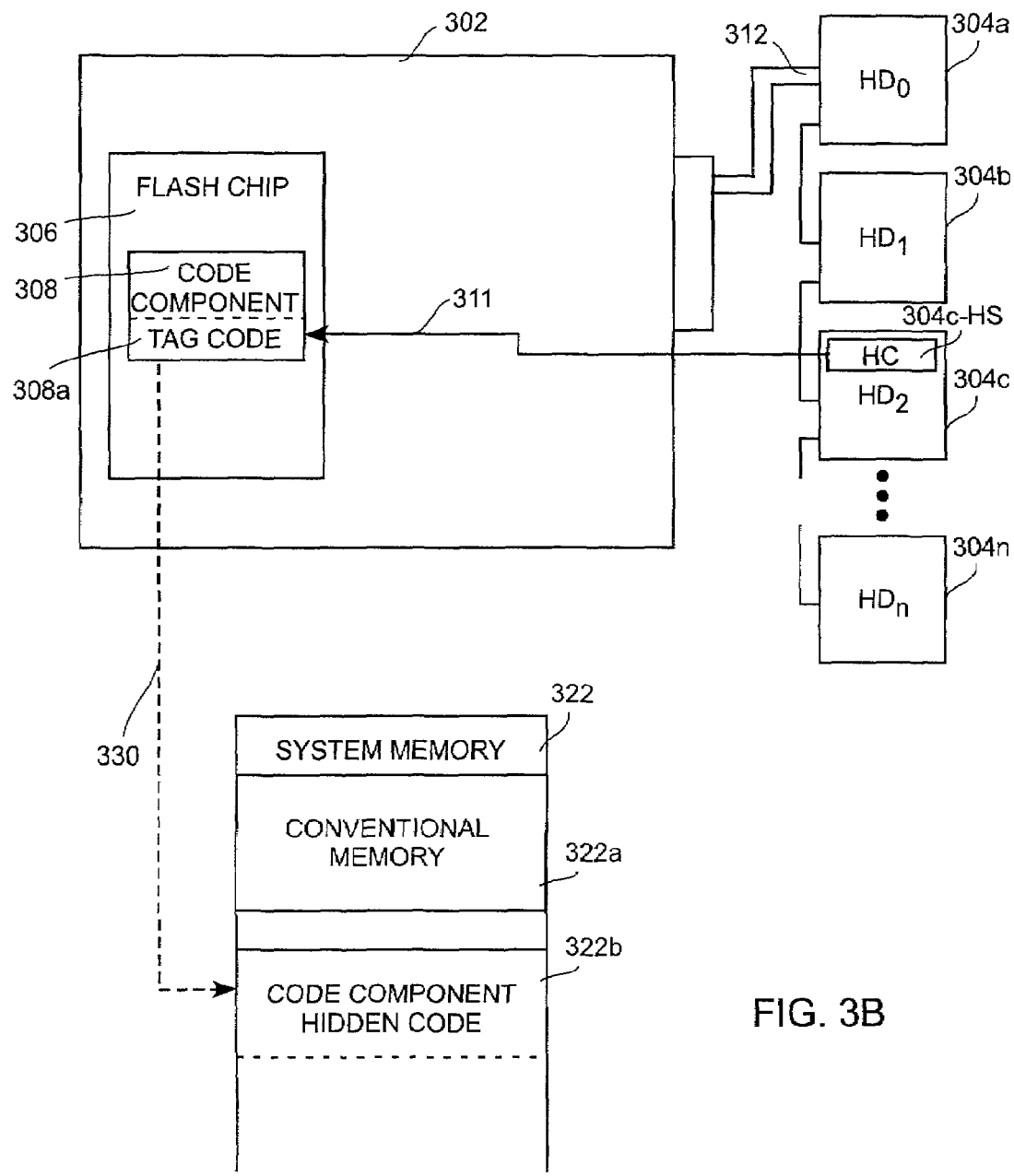
FIG. 3B is a simplified schematic diagram depicting the storing of the hidden code on the hidden sector, in accordance with still another embodiment of the present invention.

In accordance with one example, as shown in the schematic simplified diagram of FIG. 3B, the hidden code 308$b$ stored on the hidden sector 304$c$-HS is allocated and read by the CPU. The hidden code 308$b$ is then written into the system memory 322 and an EFI hidden code segment 322$b$ utilizing 330. Again, advantageously, the size of the host adapter card flash chip is reduced by storing the large portion of the code component on the hard disk drive or (hard disk drives).

Figure 4:
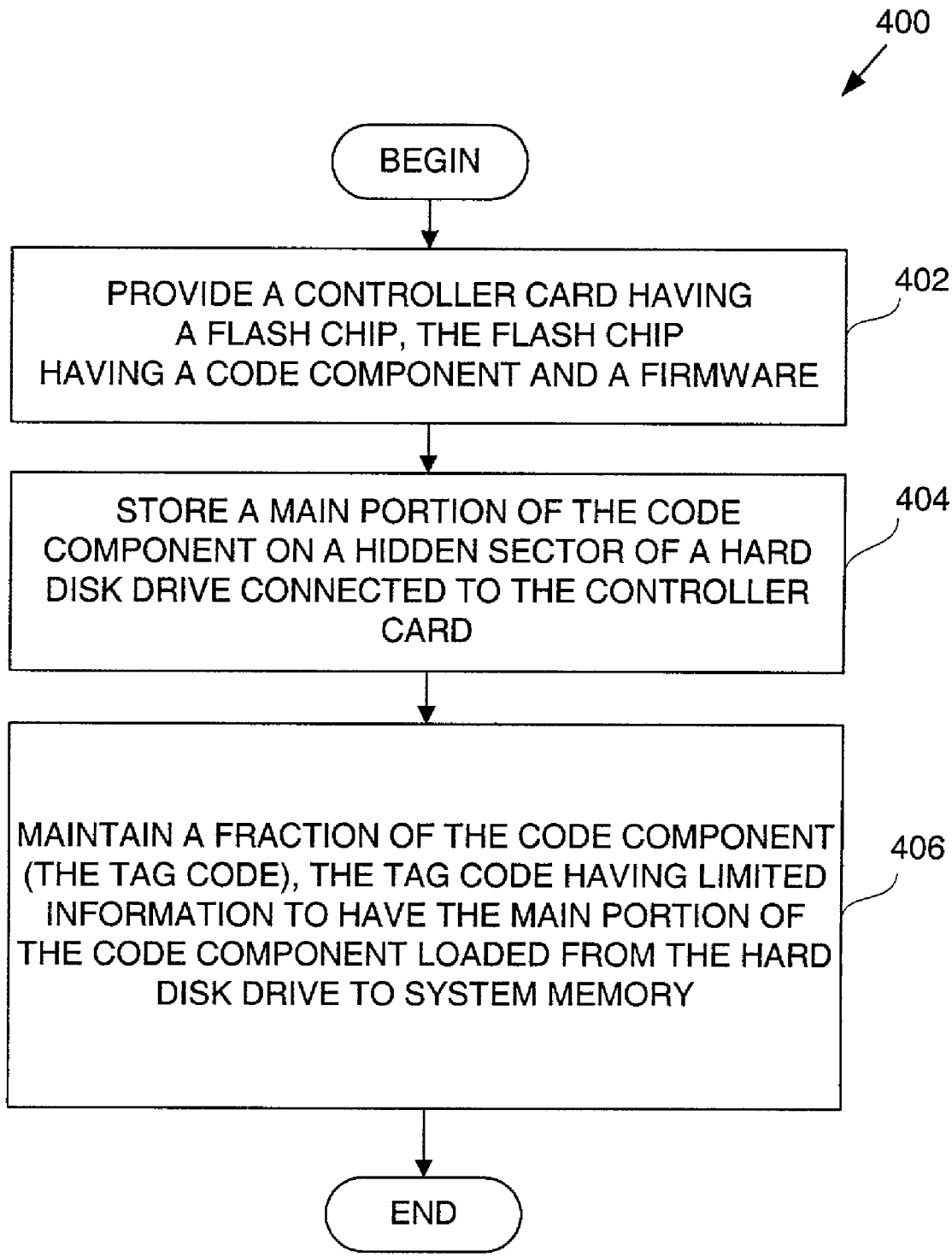
FIG. 4 is a flowchart diagram of method operations performed in storing a main portion of a code component on a hard disk drive, in accordance with yet another embodiment of the present invention.

FIG. 4 illustrates a flow chart 400 of method operations performed in storing a main portion of a code component on a hard disk drive, in accordance with one embodiment of the present invention. The method begins in operation 402 in which a controller card having a flash chip is provided. The flash chip includes the code component and firmware. In one example, the controller card is a processor-based controller card. Then, in operation 404, the main portion of the code component is stored on a hidden sector of the hard disk drive connected to the controller card. For instance, when the controller card is processor based, the RAID IOP reads the information stored on the flash card and allocates a sector on the hard disk drives to store the main portion of the code component. In one example, the main portion (i.e., the hidden code) is stored on a hidden sector, while in a different embodiment, the hidden code can be stored on a plurality of sectors.

Continuing to operation 406, a fraction of the EFI code (i.e., the tag code) is maintained on the flash chip (i.e., written to the flash chip). The tag code has limited information for locating and loading the main portion of the code component stored on the hard disk drive into the system memory. In one example, the RAID IOP reads the main portion of the code component stored on the hard disk drive and then loads same into the system memory. In this manner, compatibility differences between different system BIOSs can be substantially reduced while reducing the size of adapter card flash chip. Furthermore, implementing this technique, additional code or main portions of different codes can be stored on the hard disk drives, reducing the size of a given chip. Accordingly, this methodology is equally applicable to any type of program instructions (i.e., other than EFI).

Figure 5:
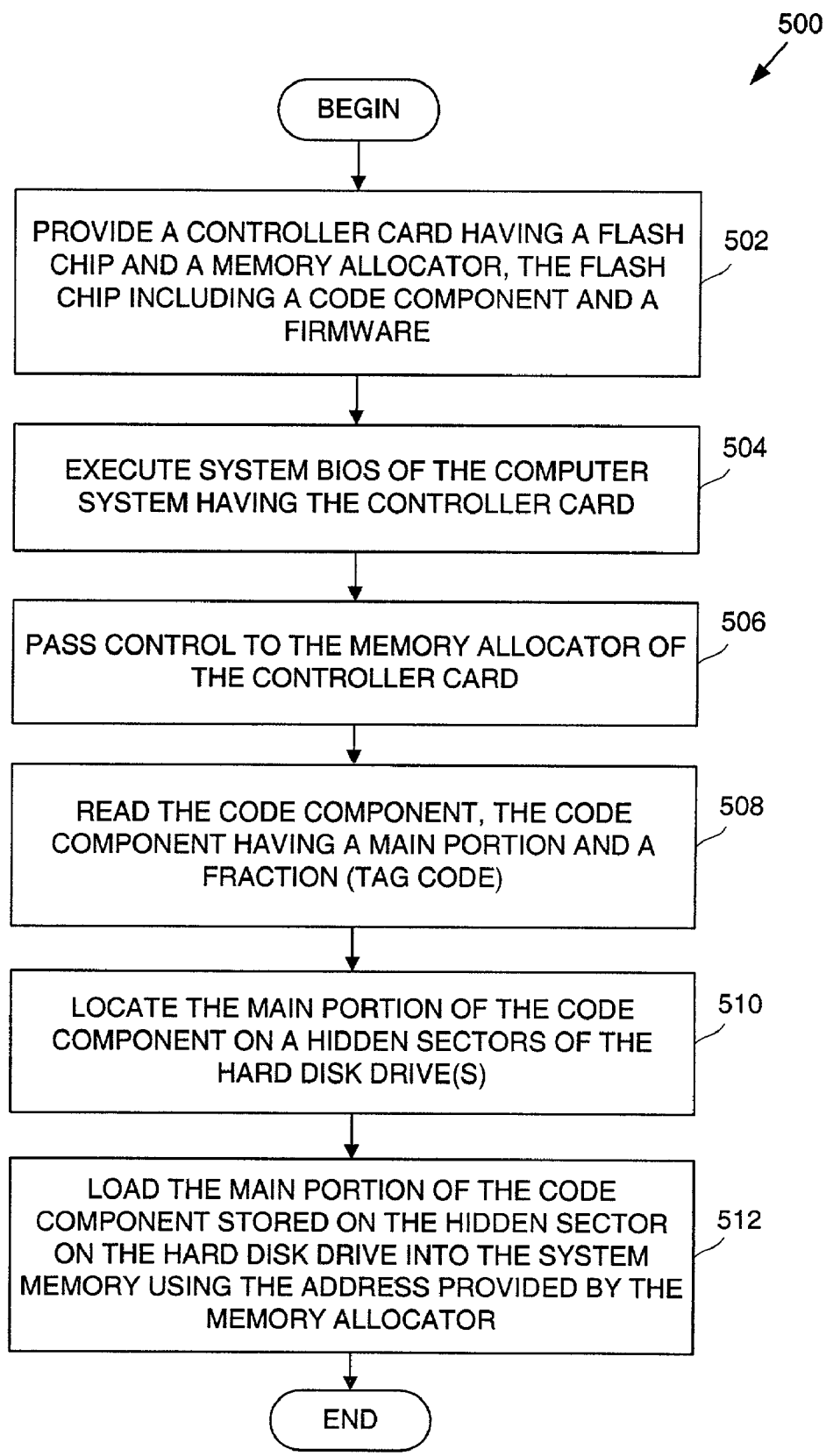
FIG. 5 is a flowchart diagram of method operations performed in loading and writing a main portion of a code component of a processor-based controller card into the system memory, in accordance with yet another embodiment of the present invention.

FIG. 5 illustrates a flow chart 500 of method operations performed in loading and writing a main portion of a code component of a processor-based controller card into the system memory, in accordance with one embodiment of the present invention. The method starts in operation 502 in which a controller card having a flash chip and a memory allocator is provided. In one example, the controller card is a processor-based controller card and includes a RAID IOP chip. Additionally, the flash chip is configured to include a code component and a firmware component. In operation 504, the system BIOS of the computer system that includes the controller card is executed. By way of example, this may occur at the time the system BIOS is locating and itemizing each and every controller card connected to the computer system. Next, in operation 506, the system BIOS passes control to the memory allocator component on the controller card. In one example, the memory allocator is the RAID IOP chip. In operation 508, the code component is read. The code component is configured to have a main portion and a fraction portion (i.e., tag code). In one example, the code component is read by the memory allocator (e.g., RAID IOP).

Continuing to operation 510, the main portion of the code component stored on a hidden sector (or sectors) of the hard disk drive (or hard disk drives) is located. In one instance, this task is achieved by the memory allocator. Next, in operation 512, the main portion of the code component stored on the hidden sector of the hard disk drive is loaded into the system memory. Preferably, locating the main portion of the code component is achieved by the memory allocator (e.g., RAID IOP).

Figure 6:
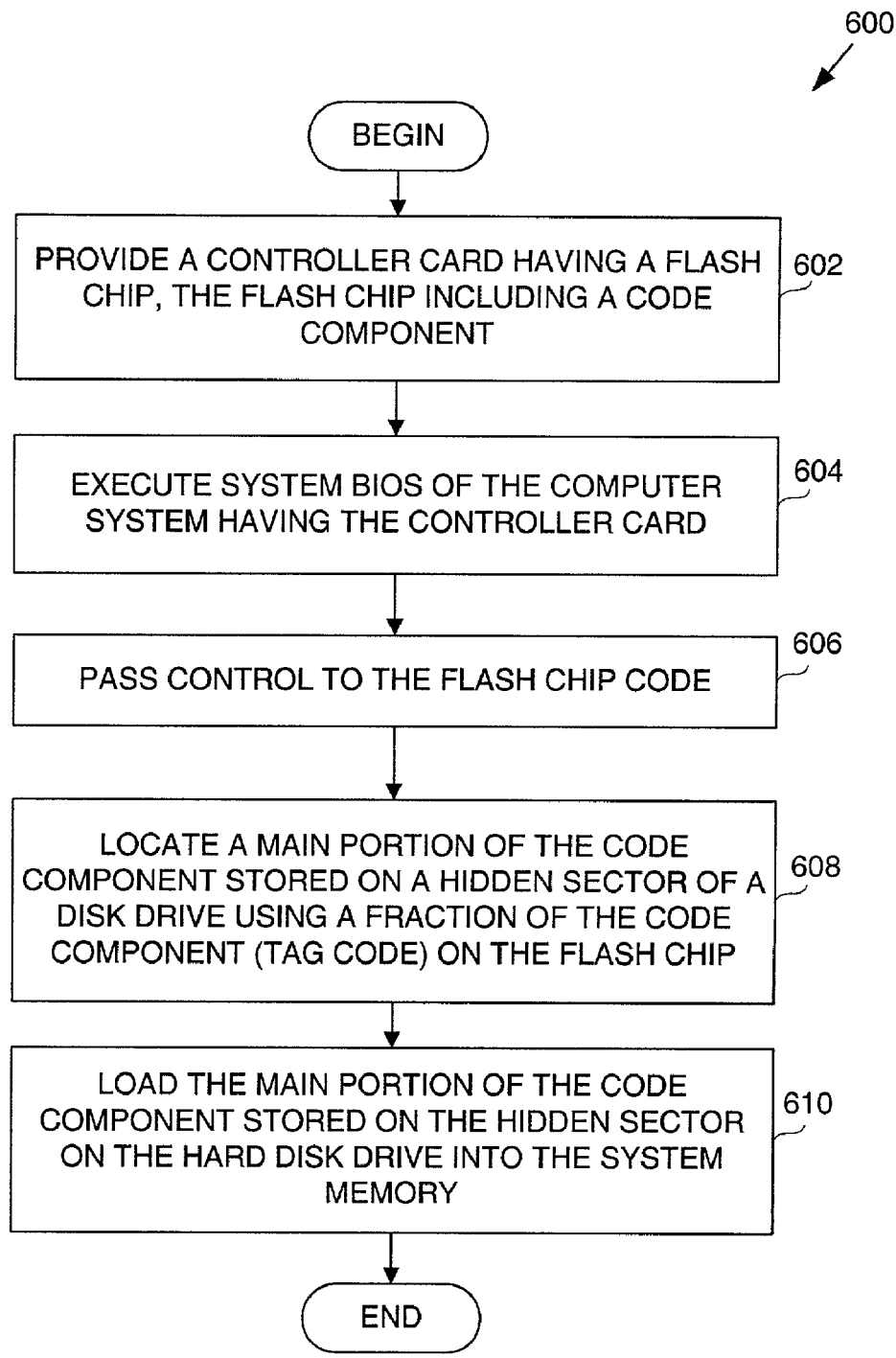
FIG. 6 is a flowchart diagram of method operations performed in loading and writing a main portion of a code component of a non-processor based controller card into the system memory, in accordance with yet another embodiment of the present invention.

FIG. 6 illustrates a flow chart 600 of method operations performed in loading and writing a main portion of a code component of a non-processor based controller card into the system memory, in accordance with one embodiment of the present invention. The method begins in operation 602 in which a controller card having a flash chip is provided. The flash chip is configured to include a code component. In operation 604, the system BIOS of the computer system having the controller card is executed followed by passing of control to the flash chip code, in operation 606.

Continuing to operation 608, the main portion of the code component stored on a hidden sector (or sectors) of a hard disk drive (or hard disk drives) connected to the controller card is located. In one preferred example, the fraction of the code component (i.e., the tag code) maintained on the flash chip is implemented to locate the main portion of the code component. Thereafter, in operation 610, the main portion of the code component stored on the hidden sector of the hard disk drive is loaded into the system memory. Again, advantageously, the code (e.g., the code component) can be stored on a smaller flash chip, thus reducing the cost of the entire host adapter cards.

Figure 7:
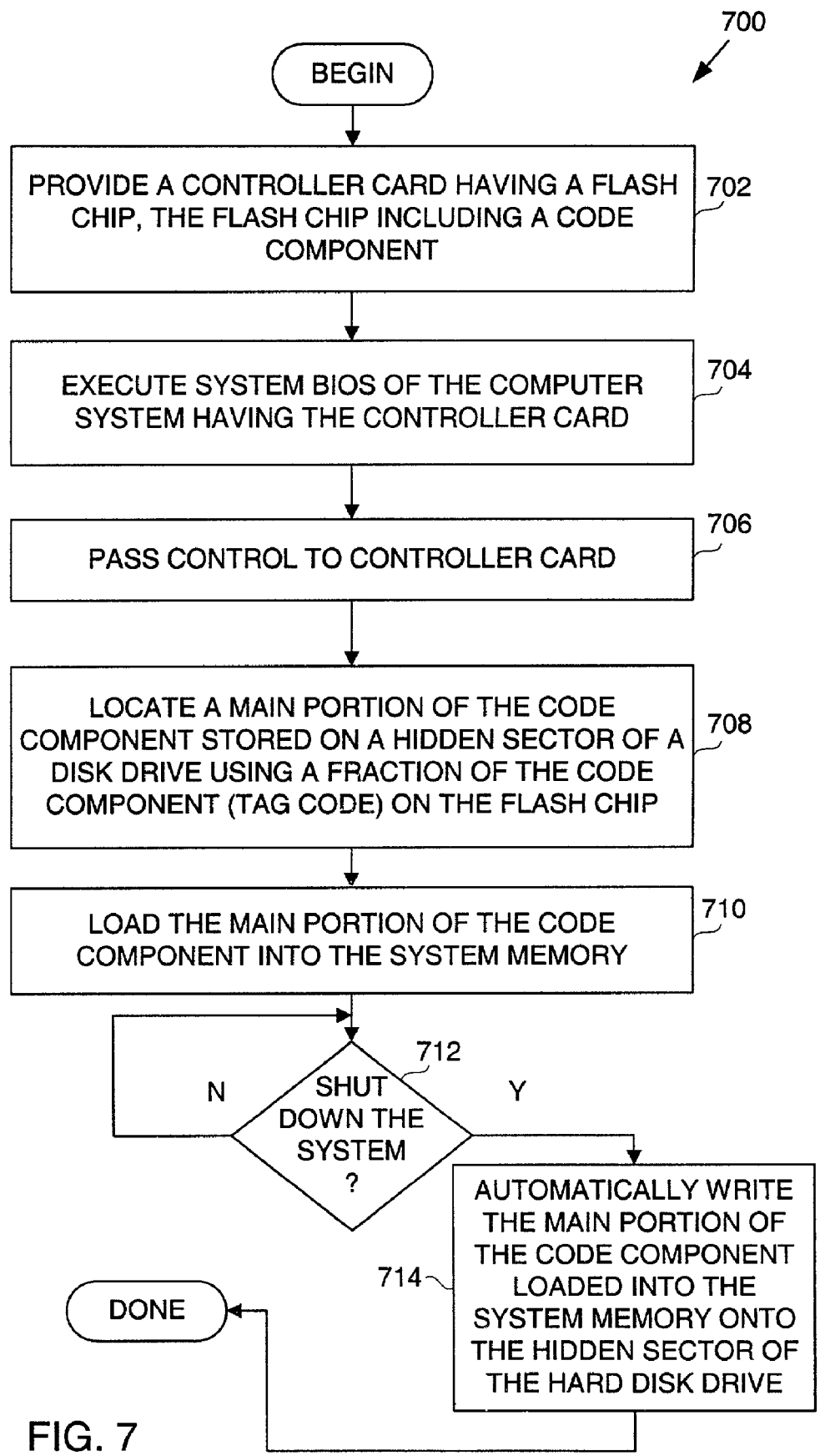
FIG. 7 is a flowchart diagram of method operations in loading and writing a main portion of a code component into a buffer chip on the controller card, in accordance with yet another embodiment of the present invention.

FIG. 7 illustrates a flow chart 700 of method operations performed in maintaining the main portion of the code component on the hidden sector (or sectors) of a hard disk drive (or drives), in accordance with another embodiment of the present invention. The method begins in operation 702 in which a controller card having a flash chip including a code component is provided. In operation 704, the system BIOS of the computer system having the controller card is executed. Next, in operation 706, the system BIOS passes control to the controller card.

Proceeding to operation 708, the main portion of the code component stored on the hidden sector of the hard disk drive is located. In one example, the main portion is located using the fraction of the code component (i.e., tag code) maintained on the flash chip. Next, in operation 710, the main portion of the code component a copy of which resides in the operating system driver, is loaded into a system memory. In operation 712, a determination is made as to whether the computer system is to be shut down. If the operating system receives a request to shut down the computer system, the method continues to operation 714 in which the main portion of the code component loaded into the system memory is automatically rewritten onto the hidden sector (or sectors) of the hard disk drive (or drives) connected to the controller card from the operating system driver. In this manner, beneficially, the main portion of the code component, as stored on the hidden sector of the hard disk drive, is kept substantially updated, minimizing the negative consequences of losing data associated with computer system shut down.

In accordance with a different embodiment of the present invention, the main portion of the code component may be configured to be stored on a plurality of cheaper memory chips of the controller card (e.g., Boot Block Flash chips, smaller size flash chips, etc.)

It must be appreciated by one having ordinary skill in the art that the code component of the present invention can be configured to be any type of code (e.g., EFI, etc.) Furthermore, it must be understood that the present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for configuring a Redundant Array of Inexpensive Disks (RAID) host adapter card, the RAID host adapter card including a flash storage chip and a RAID input/output processor (IOP), the RAID host adapter card being coupled to a peripheral connection interface (PCI) bus of a computer system and interconnected to at least one hard drive, the computer system having a system memory, the method comprising:
   booting the computer system; and
   passing control to the RAID IOP, the RAID IOP performing,
      reading the flash storage chip to execute a fraction of a code component, the fraction of the code component being previously written to the flash storage chip;
      communicating to the hard drive to locate a main portion of the code component, the main portion of the code component being previously written to a hidden region; and
      loading the main portion of the code component to the system memory of the computer system.

2. A method as recited in claim 1, wherein the fraction of the code component is configured to have instructions to cause communication with the at least one hard drive to locate the main portion of the code component.

3. A method as recited in claim 1, wherein a size of the code component is configured to range between about 0.5 Megabyte (MB) and about 4 MBs.

4. A method as recited in claim 1, wherein a size of the code component is about 0.5 MB.

5. A method as recited in claim 4, wherein a size of the fraction of the code component is about 20 KB.

6. A method as recited in claim 1, wherein the code component is an extensible firmware interface (EFI).

7. A method for configuring a Redundant Array of Inexpensive Disks (RAID) host adapter card, the RAID host adapter card including a flash storage chip and a RAID input/output processor (IOP), the RAID host adapter card being coupled to a peripheral connection interface (PCI) bus of a computer system and interconnected to at least one storage container, the computer system having system memory, the method comprising:
   booting the computer system; and
   passing control to the RAID IOP, the RAID IOP performing,
      reading the flash storage chip to execute a fraction of a code component, the fraction of the code component being previously written to the flash storage chip;
      communicating to the a hard drive to locate a main portion of the code component, the main portion of the code component being previously written to at least one hidden sector; and
      loading the main portion of the code component to the system memory of the computer system to enable interoperability of the host adapter card with the computer system.

8. A method as recited in claim 7, wherein the fraction of the code component is configured to have instructions to cause communication with the at least one storage container to locate the main portion of the code component.

9. A method as recited in claim 7, wherein the code component is an option Read Only Memory (ROM) Basic Input Output System (BIOS) code.

10. A method as recited in claim 7, wherein the code component is an IA32/IA64 option ROM BIOS code.

11. A method as recited in claim 7, wherein the storage container includes at least one hard drive.

12. A method as recited in claim 7, wherein the flash chip is configured to include a firmware.

13. A host adapter card for enabling a computer system to have operation of a Redundant Array of Inexpensive Disks (RAID), the host adapter card comprising:

a flash storage chip; and a RAID input/output processor (IOP), the host adapter card being coupled to a peripheral connection interface (PCI) bus of the computer system and interconnected to at least one hard drive; the RAID IOP being configured to read the flash storage chip to execute a fraction of an option Read Only Memory (ROM) Basic Input Output System (BIOS) code, the fraction of the option ROM BIOS code being previously written to the flash storage chip, the fraction of the option ROM BIOS code having instructions to cause communication with the at least one hard drive to locate a main portion of the option ROM BIOS code, the main portion of the option ROM BIOS code being previously written to at least one hidden sector on the at least one hard drive, the RAID IOP being further configured to copy the main portion of the option ROM BIOS code to system memory of the computer system to enable proper interoperability between the computer system and the host adapter card operating with option ROM BIOS code.

14. A host adapter card as recited in claim 13, wherein the flash storage chip has a limited memory size.

15. A host adapter card as recited in claim 13, wherein a size of the option ROM BIOS code is configured to range between about 0.5 Megabyte (MB) and about 4 MBs.

16. A host adapter card as recited in claim 13, wherein a size of the option ROM BIOS code is configured to be about 0.5 MB.

17. A host adapter card as recited in claim 16, wherein the size of the fraction of the option ROM BIOS code is configured to be about 20 KB.

18. A host adapter card as recited in claim 13, wherein the option ROM BIOS code is an extensible firmware interface (EFI).

19. A method for configuring a computer system to operate with a host adapter card, the host adapter card having a flash memory chip that has a limited memory size, the host adapter card being in communication with a hard drive of the computer system, the method comprising:

booting the computer system;

reading the flash memory chip to execute tag code of a code component resident in the flash memory, the tag code having instructions to cause communication with the hard drive to locate hidden code of the code component on the hard drive; and loading the hidden code from the hard drive to system memory of the computer system to enable interoperability of the host adapter card and the computer system.

20. A method as recited in claim 19, wherein reading the flash memory chip to execute the tag code is performed by the system Basic Input Output System (BIOS).

21. A method as recited in claim 19, wherein the flash memory chip includes a firmware.

22. A method as recited in claim 19, wherein the hidden code is previously written to at least one hidden sector of the hard drive.

23. A method for configuring a Redundant Array of Inexpensive Disks (RAID) host adapter card, the RAID host adapter card including a flash storage chip and a RAID input/output processor (IOP), the RAID host adapter card being coupled to a peripheral connection interface (PCI) bus of a computer system and interconnected to at least one hard drive, the computer system having a system memory, the method comprising:

booting the computer system; and passing control to the RAID IOP, the RAID IOP performing, reading the flash storage chip to execute a fraction of an option Read Only Memory (ROM) Basic Input Output System (BIOS) code, the fraction of the option ROM BIOS code being previously written to the flash storage chip;

communicating to the hard drive to locate a main portion of the option ROM BIOS code, the main portion of the option ROM BIOS code being previously written to a hidden region; and loading the main portion of the option ROM BIOS code to the system memory of the computer system.

24. A method as recited in claim 23, wherein the fraction of the option ROM BIOS code is configured to have instructions to cause communication with the at least one hard drive to locate the main portion of the option ROM BIOS code.

25. A method as recited in claim 23, wherein the option ROM BIOS code is an extensible firmware interface (EFI).

* * * * *